(12) United States Patent  (10) Patent No.: US 9,885,924 B2
Xie  (45) Date of Patent: Feb. 6, 2018

(54) LIQUID-CRYSTAL DISPLAY PANEL AND DEVICE

(71) Applicants: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD., Wuhan, Hubei (CN)

(72) Inventor: Chang Xie, Shenzhen (CN)

(73) Assignees: SHENZHEN CHINA STAR OPTOELECTRONICS TECHNOLOGY CO., LTD., Shenzen, Guangdong (CN); WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 261 days.

(21) Appl. No.: 14/650,439

(22) PCT Filed: Apr. 29, 2015

(86) PCT No.: PCT/CN2015/077776
§ 371 (c)(1),
(2) Date: Jun. 8, 2015

(87) PCT Pub. No.: WO2016/172869
PCT Pub. Date: Nov. 3, 2016

(65) Prior Publication Data
US 2017/0139283 A1 May 18, 2017

(30) Foreign Application Priority Data
Apr. 27, 2015 (CN) .......................... 2015 1 0202600

(51) Int. Cl.
G02F 1/1335 (2006.01)
G02F 1/1343 (2006.01)

(52) U.S. Cl.
CPC .. G02F 1/134309 (2013.01); G02F 1/133514 (2013.01); G02F 1/133528 (2013.01);
(Continued)

(58) Field of Classification Search
CPC ......... G02F 1/134309; G02F 1/134336; G02F 1/136259; G02F 2001/134381
See application file for complete search history.

(56) References Cited

U.S. PATENT DOCUMENTS 5,977,562 A * 11/1999 Hirakata ........... G02F 1/134363
257/59
6,243,154 B1 6/2001 You et al.
(Continued)

FOREIGN PATENT DOCUMENTS

CN 1607441 A 4/2005

Primary Examiner — Phu Vu
(74) Attorney, Agent, or Firm — Sughrue Mion, PLLC

(57) ABSTRACT

A liquid-crystal display panel and device are provided. The display panel includes: a first substrate; a second substrate disposed opposite to the first substrate, including a pixel electrode; a liquid-crystal layer disposed between the first substrate and the second substrate; in which the pixel electrode is spiral. The liquid-crystal display panel and device of the present invention are capable of broadening a viewing angle of the liquid-crystal display panel by shaping the pixel electrode into the spiral.

15 Claims, 4 Drawing Sheets

(52) U.S. Cl.
CPC ............ *G02F 2001/134318* (2013.01); *G02F 2201/121* (2013.01); *G02F 2201/123* (2013.01)

(56) References Cited

U.S. PATENT DOCUMENTS

| | | | |
|---|---|---|---|
| 7,369,194 B2* | 5/2008 | Yang | G02F 1/133555 |
| | | | 349/106 |
| 2001/0045556 A1 | 11/2001 | Hirakata et al. | |
| 2005/0083466 A1 | 4/2005 | Lee et al. | |
| 2005/0128401 A1 | 6/2005 | Lee | |
| 2005/0128402 A1* | 6/2005 | Lee | G02F 1/134363 |
| | | | 349/139 |
| 2007/0146607 A1* | 6/2007 | Lee | G02F 1/134363 |
| | | | 349/141 |

\* cited by examiner

LIQUID-CRYSTAL DISPLAY PANEL AND DEVICE

TECHNICAL FIELD OF THE INVENTION

The present invention relates to a liquid-crystal technology, and in particular to a liquid-crystal display (LCD) panel and device.

BACKGROUND OF THE INVENTION

A conventional liquid-crystal display panel, which is shown in FIG. 1, includes a first substrate 20, a second substrate 10, and a liquid-crystal layer 30. The second substrate 10 and the first substrate 20 are disposed opposite to each other, and the second substrate 10 includes a first common electrode 12 and a pixel electrode 11. The LC layer 30 is located between the first substrate 20 and the second substrate 10. The prior art pixel electrode 11 generally is a stripe-shaped structure, so that the direction of the electric field formed between the first common electrode and the pixel electrode is relatively simple. The liquid-crystal molecules cannot be twisted in various directions, and therefore cannot achieve multi-view display.

Therefore, there is a significant need to provide a liquid-crystal display panel and device for solving the problems existing in the prior art.

SUMMARY OF THE INVENTION

An objective of the present invention is to provide a liquid-crystal display panel and device for solving the technical problem that the view angle cannot be broadened in the prior art liquid-crystal display panel.

To achieve the foregoing objective, the present invention provides a liquid-crystal display panel, which includes: a first substrate; a second substrate disposed opposite to the first substrate, comprising a pixel electrode and a first common electrode; and a liquid-crystal layer disposed between the first substrate and the second substrate.

The pixel electrode herein is spiral. The pixel electrode includes at least two pixel electrode spiral pitches, and any two of the pixel electrode spiral pitches are not equal.

The first common electrode and the pixel electrode are interlaced and arranged at intervals, and the first common electrode is also spiral.

In the liquid-crystal display panel of the present invention, the pixel electrode spiral pitches are greater than or equal to 2 microns and less than or equal to 8 microns.

In the liquid-crystal display panel of the present invention, the first common electrode comprises at least two common electrode spiral pitches, and any two of the common electrode spiral pitches are not equal.

In the liquid-crystal display panel of the present invention, the common electrode spiral pitches are greater than or equal to 2 microns and less than or equal to 8 microns.

In the liquid-crystal display panel of the present invention, the first substrate is a color filter (CF) substrate, and the second substrate is an array substrate.

In the liquid-crystal display panel of the present invention, there is a first polarizer disposed on an outside of the first substrate.

In the liquid-crystal display panel of the present invention, there is a second polarizer disposed on an outside of the second substrate.

The present invention further provides a liquid-crystal display device, which includes: a backlight module and a liquid-crystal display panel. The liquid-crystal display panel herein includes: a first substrate; a second substrate disposed opposite to the first substrate, comprising a pixel electrode; and a liquid-crystal layer disposed between the first substrate and the second substrate. The pixel electrode herein is spiral.

In the liquid-crystal display device of the present invention, the pixel electrode includes at least two pixel electrode spiral pitches, and any two of the pixel electrode spiral pitches are not equal.

In the liquid-crystal display device of the present invention, the pixel electrode spiral pitches are greater than or equal to 2 microns and less than or equal to 8 microns.

In the liquid-crystal display device of the present invention, the second substrate further includes a first common electrode. The first common electrode and the pixel electrode are interlaced and arranged at intervals, and the first common electrode is also spiral.

In the liquid-crystal display device of the present invention, the first common electrode comprises at least two common electrode spiral pitches, and any two of the common electrode spiral pitches are not equal.

In the liquid-crystal display device of the present invention, the common electrode spiral pitches are greater than or equal to 2 microns and less than or equal to 8 microns.

In the liquid-crystal display device of the present invention, the first substrate is a color filter substrate, and the second substrate is an array substrate.

In the liquid-crystal display device of the present invention, there is a first polarizer disposed on an outside of the first substrate.

In the liquid-crystal display device of the present invention, there is a second polarizer disposed on an outside of the second substrate.

The liquid-crystal display panel and device of the present invention increase the directions of the electric field between the pixel electrode and the first common electrode by means of shaping the pixel electrode into the spiral, so that the twist angles of the liquid-crystal molecules are more various, thereby broadening the viewing angle of the liquid-crystal display panel.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
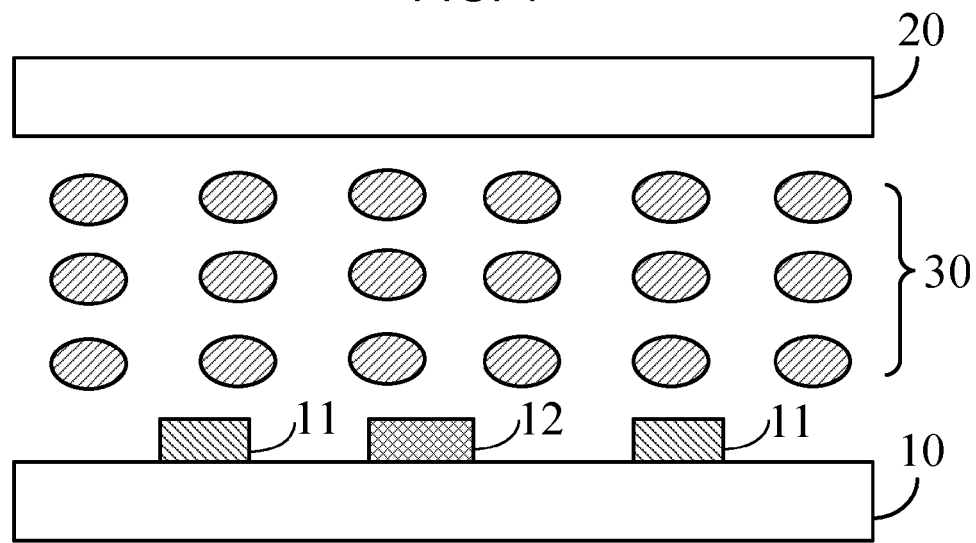
FIG. 1 is a schematic drawing illustrating a liquid-crystal display panel in the prior art.

Descriptions of the following embodiments refer to attached drawings which are utilized to exemplify specific embodiments. Directional terms mentioned in the present invention, such as "top" and "down", "front", "rear", "left", "right", "inside", "outside", "side" and so on are only directions with respect to the attached drawings. Therefore, the used directional terms are utilized to explain and understand the present invention but not to limit the present invention.

In different drawings, the same reference numerals refer to like parts throughout the drawings.

Figure 2:
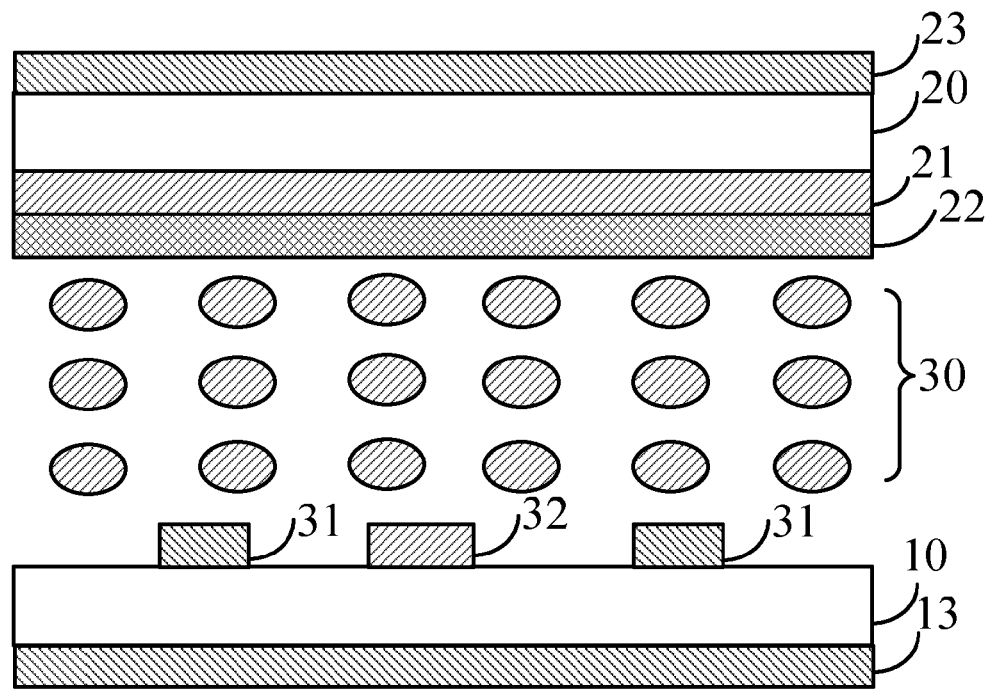
FIG. 2 is a schematic drawing illustrating a liquid-crystal display panel according to a first embodiment of the present invention.

Referring to FIG. 2, FIG. 2 is a schematic drawing illustrating a liquid-crystal display panel according to a first embodiment of the present invention.

The liquid-crystal display panel of the present invention, as shown in FIG. 2, includes a first substrate 20, a second substrate 10, a liquid-crystal layer 30. The LC layer 30 is located between the first substrate 20 and the second substrate 10. The second substrate 10 and the first substrate 20 are disposed opposite to each other, and the second substrate 10 includes a first common electrode 32 and a pixel electrode 31.

Figure 3:
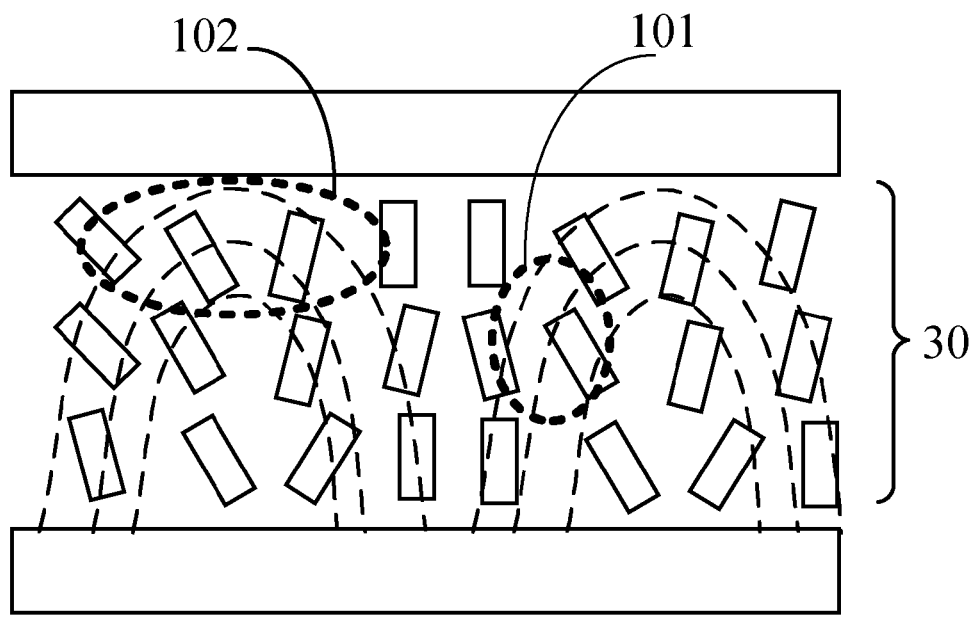
FIG. 3 is a simulated diagram illustrating an electric field when the liquid-crystal display panel of the present invention has no protective layer.
Figure 4:
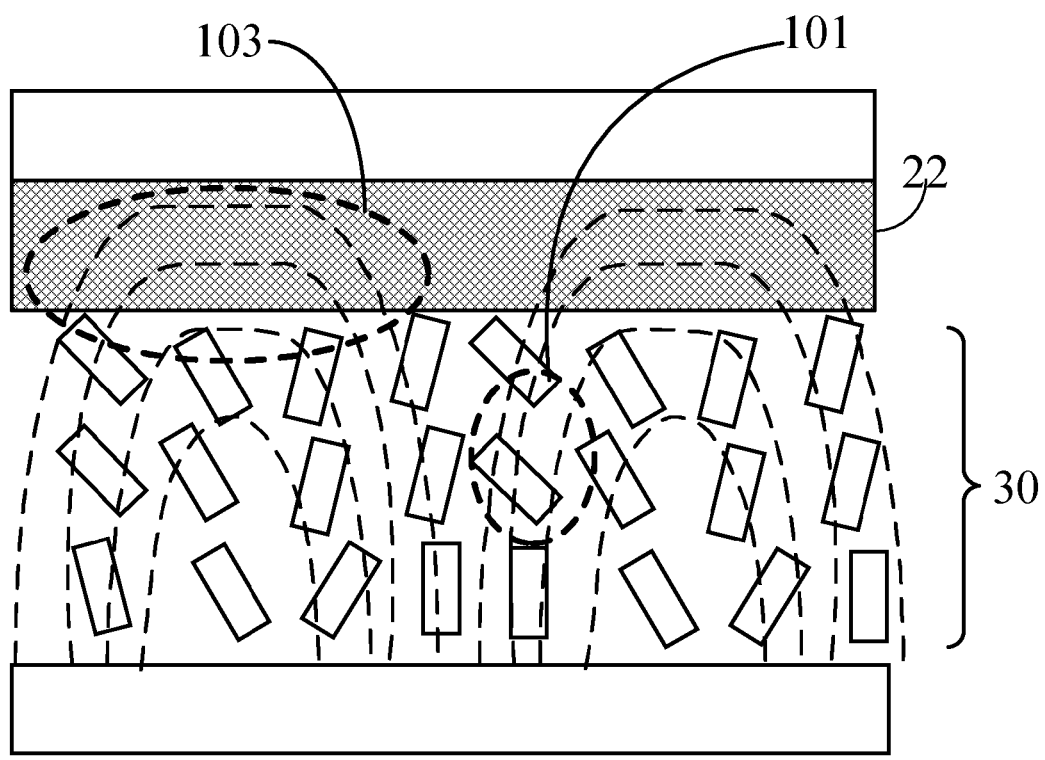
FIG. 4 is a simulated diagram illustrating an electric field when the liquid-crystal display panel of the present invention has a protective layer.

The first substrate 20 further includes a planarization layer 22, and the planarization layer 22 is utilized to prevent the liquid-crystal from contaminating. Moreover, the planarization layer 22 further can increase a range of a horizontal electric field, FIG. 3 shows simulated diagram illustrating an electric field under a condition that there is no planarization layer under, as shown in FIG. 3, a vertical electric field shown as 101 of the drawing, the horizontal electric field shown as 102 of the drawing. FIG. 4 shows simulated diagram illustrating an electric field under a condition that there is a planarization layer under. As shown in FIG. 4, when the planarization layer 22 is added, it can be seen from 103 of the drawing that the range of the formed horizontal electric field is expanded. Since the horizontal electric field is more conducive to the twist of the liquid-crystal molecules, a driving voltage can be decreased, and a light efficiency is also enhanced.

Figure 5:
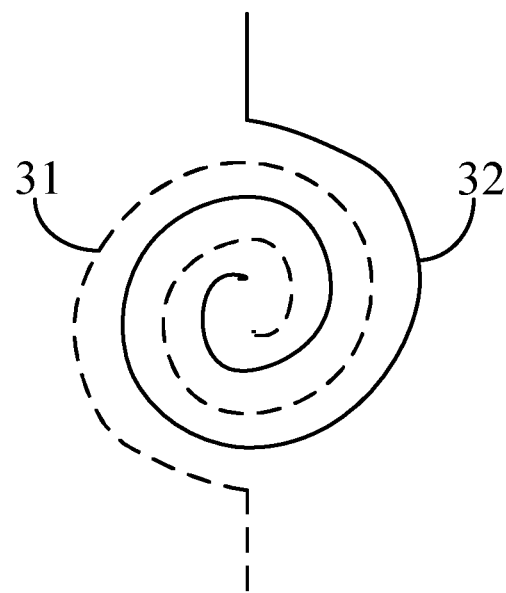
FIG. 5 is a schematic drawing illustrating a pixel electrode and a first common electrode of the present invention.

The pixel electrode is shaped into a spiral, whose specific shape can refer to FIG. 5. In conjunction with FIG. 6, the spiral pixel electrode may include two or more than two spiral threads. The spiral threads can be curved or zigzag.

The direction of the electric field formed between the first common electrode and the pixel electrode in the prior art is relatively simple. However, the spiral pixel electrode utilized in the present invention is capable of making the electric field formed between the first common electrode and the pixel electrode have more various directions, thereby making the liquid-crystal molecules have a variety of twist angles (360 degrees). With the addition of the twist angles of liquid-crystal molecules, it is thus more conducive to the realization of multi-domain display and a wider viewing angle of the liquid-crystal display panel. Moreover, the manufacturing process utilizing this structure to achieve the multi-domain display is simpler than the prior art implementation, and thus the production cost can also be reduced.

Figure 6:
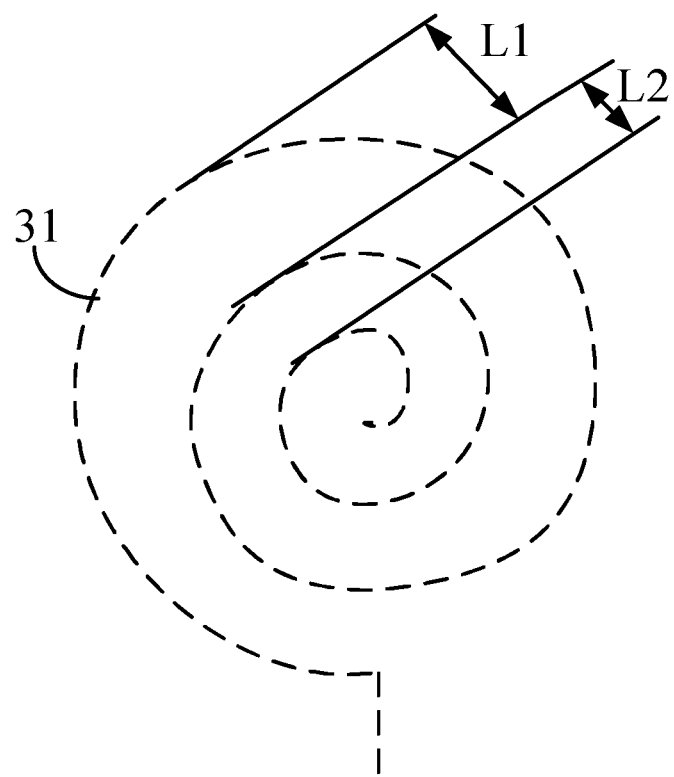
FIG. 6 is a schematic drawing illustrating a preferable pixel electrode of the present invention.

Preferably, as shown in FIG. 6, the pixel electrode 31 includes at least two pixel electrode spiral pitches (such as L1, L2), and any two of the pixel electrode spiral pitches are not equal—L1 is not equal to L2; that is, all the pixel electrode spiral pitches are not equal. When the pixel electrode spiral pitches are not all equal, it is capable of making the electric field formed within the spiral threads different, thereby being able to obtain the electric field with more directions, facilitating the liquid-crystal molecules to twist toward more directions for expanding the viewing angle.

Preferably, the pixel electrode spiral pitch L1 or L2 is greater than or equal to 2 microns and less than or equal to 8 microns. When the pixel electrode spiral pitches are excessively small, the electric field between each spiral thread will appear interference; when the pixel electrode spiral pitch is too large, the electric field intensity generated between each spiral thread is insufficient, so that the liquid-crystal molecules cannot be twisted.

Preferably, as shown in FIG. 2, a first polarizer 23 can be disposed on an outside of the first substrate 20; a second polarizer 13 can be disposed on an outside of the second substrate 10.

Preferably, the second substrate 10 may further include a switch array layer and a plurality of pixel units (not shown in the drawings). The switch array layer includes a plurality of switching elements such as thin-film transistors. The second substrate 10 further includes a plurality of data lines and scanning lines. The pixel unit may include a main pixel region and sub-pixel regions. The scanning lines further include a main scanning line and a sub scanning line. The main pixel region includes a first thin-film transistor and a main liquid-crystal capacitor; the sub-pixel regions include a second thin-film transistor and a sub liquid-crystal capacitor. The sub-pixel region further includes a third thin-film transistor and a sharing capacitor.

Gates of the first thin-film transistor and the second thin-film transistor are coupled to the main scanning line. A drain of the first thin-film transistor is coupled to the main liquid-crystal capacitor. Sources of the first thin-film transistor and the second thin-film transistor are coupled to the data line. A drain of the second thin-film transistor is coupled to the sub liquid-crystal capacitor. A gate of the third thin-film transistor is coupled to the sub scanning line. A source of the third thin-film transistor is coupled to a drain of the second thin-film transistor. A drain of the third thin-film transistor is coupled to the sharing capacitor, thereby solving a color shift problem under the large viewing angle and improving the display effect.

The first substrate 20 can be a color filter substrate, and the second substrate can be an array substrate. Of course, the second substrate 10 can also be a COA substrate.

Preferably, in conjunction with FIG. 2 and FIG. 5, the first common electrode 32 and the pixel electrode 31 are interlaced and arranged at intervals, and the first common electrode 32 is also spiral. Using this structure can increase the directions of the electric field to the most degree and broaden the viewing angle to a greater scope.

Preferably, the first common electrode 32 also includes at least two common electrode spiral pitches, and any two of the common electrode spiral pitches are not equal; that is, all the pixel electrode spiral pitches are not equal. The number of the common electrode spiral pitches is equal to the number of the pixel electrode spiral pitches. The common electrode spiral pitches are greater than or equal to 2 microns and less than or equal to 8 microns.

Preferably, in conjunction with FIG. 5, the first common electrode 32 and the pixel electrode 31 are symmetric (symmetric about a center of symmetry), so that a greater voltage difference is formed between the pixel electrode and the first common electrode for facilitating the liquid-crystal molecules to twist.

The first substrate 20 further includes a second common electrode 21 for enhancing the electric field intensity that utilized to drive the liquid-crystal molecules.

Figure 7:
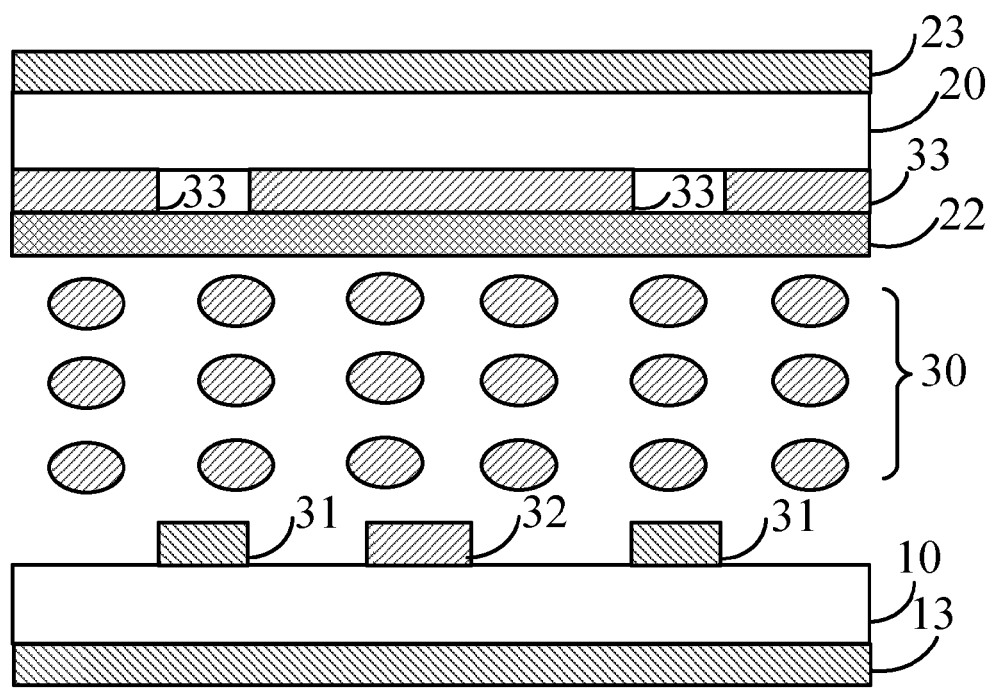
FIG. 7 is a schematic drawing illustrating a liquid-crystal display panel according to a second embodiment of the present invention.

Referring to FIG. 7, FIG. 7 is a schematic drawing illustrating a liquid-crystal display panel according to a second embodiment of the present invention;

The liquid-crystal display panel of the present invention, as shown in FIG. 7, includes a first substrate 20, a second substrate 10, an LC layer 30. The LC layer 30 is located between the first substrate 20 and the second substrate 10. The first substrate 20 further includes a second common electrode 33. The second substrate 10 is disposed opposite to the first substrate 20. The second substrate 10 includes a first common electrode 32 and a pixel electrode 31. The first substrate 20 further includes a planarization layer 22. A first polarizer 23 can be disposed on an outside of the first substrate 20. A second polarizer 13 can be disposed on an outside of the second substrate 10.

The difference between the embodiment and the first embodiment is that the projection of the pixel electrode 31 on the first substrate 20 does not overlap with the pattern of the second common electrode 33 on the first substrate 20. That is, the portion of the second common electrode 33 that is directly opposite to the pixel electrode 31 is removed, and the portion of the second common electrode 33 that is not directly opposite to the pixel electrode 31 is retained.

When no voltage is applied, the initial orientation of the liquid-crystal molecules is vertical. When a voltage is applied, since the second common electrode 31 is not directly opposite to the pixel electrode 31, the horizontal electric field is thus strengthened. Since the second common electrode 33 that is directly opposite to the pixel electrode 31 does not exist, the vertical electric field is not generated, thereby more facilitating the liquid-crystal molecules to twist. That is, the liquid-crystal molecules can be twisted without a higher driving voltage can deflect, as well as the light efficiency is enhanced.

Figure 8:
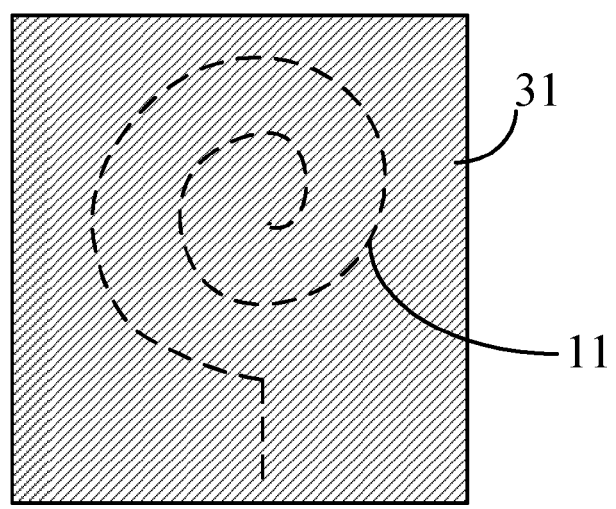
FIG. 8 is a schematic drawing illustrating a second common of the present invention.

Furthermore, as shown in FIG. 8, the pixel electrode 31 is spiral,—a spiral portion as shown in a dashed line of the drawing. Under this condition, the second common electrode 33 is the portion that corresponds to a portion outside the spiral pixel electrode 31—the region outside the spiral pixel electrode of the drawing. By utilizing the above pixel electrode structure, it is capable of generating the electric field with more directions, so that the liquid-crystal molecules have various twist angles for facilitating multi-domain display and broadening the viewing angle of the liquid-crystal display panel.

The liquid-crystal display panel of the present invention increases the directions of the electric field between the pixel electrode and the common electrode by means of shaping the pixel electrode into the spiral, so that the twist angles of the liquid-crystal molecules are more various, thereby broadening the viewing angle of the liquid-crystal display panel.

The present invention further provides a liquid-crystal display device, which includes a backlight module and a liquid-crystal display panel. In conjunction with FIG. 2, the liquid-crystal display panel herein includes: a first substrate 20, the first substrate 20 further including a planarization layer 22, the planarization layer 22 utilized to protect the first common electrode 32, to prevent the liquid-crystal from contaminating, and to increase the range of the horizontal electric field; a second substrate 10 disposed opposite to the first substrate 20, second substrate 10 including a pixel electrode 31; and an LC layer 20 disposed between the first substrate 20 and the second substrate 10.

A first polarizer 32 can be disposed on an outside of the first substrate 20; a second polarizer 13 can be disposed on an outside of the second substrate 10.

In conjunction with FIG. 5, the pixel electrode 31 herein is spiral.

The direction of the electric field formed between the first common electrode and the pixel electrode in the prior art is relatively simple. The spiral pixel electrode utilized in the present invention is capable of making the electric field formed between the first common electrode and the pixel electrode have more various directions, thereby making the liquid-crystal molecules have a variety of twist angles (360 degrees). With the addition of the twist angles of liquid-crystal molecules, it is thus more conducive to the realization of multi-domain display and a wider viewing angle of the liquid-crystal display panel. Moreover, the manufacturing process utilizing this structure to achieve the multi-domain display is simpler, and thus the production cost can also be reduced.

The first substrate 20 can be a CF substrate, and the second substrate 10 can be an array substrate.

Preferably, the pixel electrode 31 includes at least two pixel electrode spiral pitches, and any two of the pixel electrode spiral pitches are not equal.

Preferably, the pixel electrode spiral pitches are greater than or equal to 2 microns and less than or equal to 8 microns. Preferably, the second substrate further includes a first common electrode. The first common electrode and the pixel electrode are interlaced and arranged at intervals, and the first common electrode is also spiral.

Preferably, the first common electrode 32 includes at least two common electrode spiral pitches, and any two of the common electrode spiral pitches are not equal.

Preferably, the common electrode spiral pitches are greater than or equal to 2 microns and less than or equal to 8 microns.

The liquid-crystal display device of the present invention increases the directions of the electric field between the pixel electrode and the first common electrode by means of shaping the pixel electrode into the spiral, so that the twist angles of the liquid-crystal molecules are more various, thereby broadening the viewing angle of the liquid-crystal display panel.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:
1. A liquid-crystal display panel, comprising:
a first substrate;
a second substrate disposed opposite to the first substrate, comprising a pixel electrode and a first common electrode; and
a liquid-crystal layer disposed between the first substrate and the second substrate;

wherein the pixel electrode is spiral; the pixel electrode includes at least two pixel electrode spiral pitches, and any two of the pixel electrode spiral pitches are not equal;

the first common electrode and the pixel electrode are interlaced and arranged at intervals, and the first common electrode is also spiral.

2. The liquid-crystal display panel according to claim 1, wherein the pixel electrode spiral pitches are greater than or equal to 2 microns and less than or equal to 8 microns.

3. The liquid-crystal display panel according to claim 1, wherein the first common electrode comprises at least two common electrode spiral pitches, and any two of the common electrode spiral pitches are not equal.

4. The liquid-crystal display panel according to claim 3, wherein the common electrode spiral pitches are greater than or equal to 2 microns and less than or equal to 8 microns.

5. The liquid-crystal display panel according to claim 1, wherein the first substrate is a color filter substrate, and the second substrate is an array substrate.

6. The liquid-crystal display panel according to claim 1, wherein there is a first polarizer disposed on an outside of the first substrate.

7. The liquid-crystal display panel according to claim 1, wherein there is a second polarizer disposed on an outside of the second substrate.

8. A liquid-crystal display device, comprising:
a backlight module and a liquid-crystal display panel;
wherein the liquid-crystal display panel comprises:
a first substrate;
a second substrate disposed opposite to the first substrate, comprising a pixel electrode; and
a liquid-crystal layer disposed between the first substrate and the second substrate;
wherein the pixel electrode is spiral, and
wherein the pixel electrode includes at least two pixel electrode spiral pitches, and any two of the pixel electrode spiral pitches are not equal.

9. The liquid-crystal display device according to claim 8, wherein the pixel electrode spiral pitches are greater than or equal to 2 microns and less than or equal to 8 microns.

10. The liquid-crystal display device, according to claim 8, wherein the second substrate further includes a first common electrode, the first common electrode and the pixel electrode are interlaced and arranged at intervals, and the first common electrode is also spiral.

11. The liquid-crystal display device according to claim 10, wherein the first common electrode comprises at least two common electrode spiral pitches, and any two of the common electrode spiral pitches are not equal.

12. The liquid-crystal display device according to claim 11, wherein the common electrode spiral pitches are greater than or equal to 2 microns and less than or equal to 8 microns.

13. The liquid-crystal display device according to claim 8, wherein the first substrate is a color filter substrate, and the second substrate is an array substrate.

14. The liquid-crystal display device according to claim 8, wherein there is a first polarizer disposed on an outside of the first substrate.

15. The liquid-crystal display device according to claim 8, wherein there is a second polarizer disposed on an outside of the second substrate.

* * * * *